US012665351B2

(12) United States Patent
Spincich et al.

(10) Patent No.: US 12,665,351 B2
(45) Date of Patent: Jun. 23, 2026

(54) METHOD AND SYSTEM FOR BLIND CONNECTION

(71) Applicant: TE Connectivity Italia Distribution S.r.l., Turin (IT)

(72) Inventors: Demis Spincich, Turin (IT); Fulvio Amerio, Turin (IT); Alessandro Genta, Collegno (IT)

(73) Assignee: TE Connectivity Italia Distribution S.R.L., Turin (IT)

( * ) Notice: Subject to any disclaimer, the term of this patent is extended or adjusted under 35 U.S.C. 154(b) by 293 days.

(21) Appl. No.: 18/450,699

(22) Filed: Aug. 16, 2023

(65) Prior Publication Data

US 2024/0063577 A1 Feb. 22, 2024

(30) Foreign Application Priority Data

Jun. 1, 2023 (IT) ........................ 102023000011262

(51) Int. Cl.
*H01R 13/631* (2006.01)
*H01R 43/26* (2006.01)

(52) U.S. Cl.
CPC ......... *H01R 13/6315* (2013.01); *H01R 43/26* (2013.01)

(58) Field of Classification Search
CPC ............................ H01R 13/6315; H01R 43/26
USPC .................................................. 439/248, 247
See application file for complete search history.

(56) References Cited

U.S. PATENT DOCUMENTS

| | | | | | |
|---|---|---|---|---|---|
| 4,853,830 | A * | 8/1989 | Corfits | H01R 13/631 439/378 |
| 6,155,857 | A | 12/2000 | Kato et al. | |
| 9,949,029 | B2 * | 4/2018 | Barratt | H03H 17/0286 |
| 10,411,406 | B1 * | 9/2019 | Hill | H01R 13/6315 |
| 10,958,014 | B1 * | 3/2021 | Martin | H01R 13/6215 |
| 2006/0079107 | A1 * | 4/2006 | Allensworth | H01R 13/6277 439/271 |
| 2013/0309886 | A1 | 11/2013 | Alain-Christophe et al. | |
| 2015/0333446 | A1 * | 11/2015 | Yuan | H01R 13/665 439/248 |

(Continued)

FOREIGN PATENT DOCUMENTS

| | | |
|---|---|---|
| CN | 215989442 U | 3/2022 |
| DE | 102019211563 A1 | 2/2020 |

(Continued)

OTHER PUBLICATIONS

Korean Office Action dated Oct. 8, 2024 with English translation, corresponding to Application No. 10-2023-0106801, 14 pages.

(Continued)

*Primary Examiner* — Gary F Paumen
(74) *Attorney, Agent, or Firm* — Barley Snyder

(57) ABSTRACT

A blind connection system includes a main first connector, a main second connector, and a compensation frame. The main second connector is adapted for insertion into the main first connector along an insertion direction. The compensation frame is arranged between the main first connector and the main second connector. The compensation frame includes a plurality of elastic elements adapted to generate a compensation force and induce a displacement of at least one part of the main second connector along the insertion direction.

19 Claims, 16 Drawing Sheets

(56) References Cited

U.S. PATENT DOCUMENTS

| | | | | |
|---|---|---|---|---|
| 2022/0102889 | A1* | 3/2022 | Boyd | H01R 12/714 |
| 2023/0056007 | A1 | 2/2023 | Wolter et al. | |

FOREIGN PATENT DOCUMENTS

| | | | | |
|---|---|---|---|---|
| DE | 102020004182 | A1 | 1/2022 | |
| EP | 0333616 | A2 * | 9/1989 | H05K 7/1454 |
| EP | 0702429 | A2 | 3/1996 | |
| EP | 0753905 | A1 | 1/1997 | |
| EP | 0794594 | A2 | 9/1997 | |
| EP | 2555342 | A1 | 2/2013 | |
| JP | H09245887 | A | 9/1997 | |
| WO | 2015084246 | A1 | 6/2015 | |
| WO | 2016073135 | A1 | 5/2016 | |

OTHER PUBLICATIONS

Search Report and Written Opinion from the Patent and Trademark Office of Italy dated Apr. 5, 2023, corresponding to Application No. 10 2022 000 017 349, 14 pages.

The Extended European Search Report dated Apr. 29, 2024, corresponding to Application No. 23191661.0-1201, 16 pages.

* cited by examiner

METHOD AND SYSTEM FOR BLIND CONNECTION

CROSS-REFERENCE TO RELATED APPLICATION

This application claims the benefit of Italian Patent Application Nos. 102022000017349, filed Aug. 17, 2022, and 102023000011262, filed Jun. 1, 2023, the whole disclosures of which are incorporated herein by reference.

FIELD OF THE INVENTION

Embodiments of the present disclosure relate to the technical field of electrical connections and, in particular to a method and a system for realizing blind connections.

BACKGROUND

Known electrical connectors systems include male and female electrical connectors, each of which includes a dielectric housing and at least one electrical terminal securely mounted therein. The male and female connectors may be advantageously assembled by means of an automated machine.

In some situations, particularly when the female and/or the male connectors are accommodated in predefined housings and are partially hidden by parts of those housings, it may be necessary to implement a blind connection, which is a connection that does not require any assistance from human operators and that can automatically compensate for significant misalignments along directions perpendicular to the insertion direction. Moreover, it may be necessary to automatically compensate for misalignments along the insertion direction, for instance when the male and female connectors are not perfectly parallel to each other.

Known blind connection systems do not facilitate overcoming large misalignments along directions perpendicular to the insertion direction, such as misalignments of ±4 mm. Furthermore, these systems do not allow overcoming also misalignments along the insertion direction.

Improved blind connection systems are desired.

SUMMARY

According to an embodiment of the present disclosure, a blind connection system includes a main first connector, a main second connector, and a compensation frame. The main second connector is adapted for insertion into the main first connector along an insertion direction. The compensation frame is arranged between the main first connector and the main second connector. The compensation frame includes a plurality of elastic elements adapted to generate a compensation force and induce a displacement of at least one part of the main second connector along the insertion direction.

BRIEF DESCRIPTION OF THE DRAWINGS

The invention will now be described by way of example with reference to the accompanying Figures, of which.

DETAILED DESCRIPTION OF THE EMBODIMENTS

Figure 1:
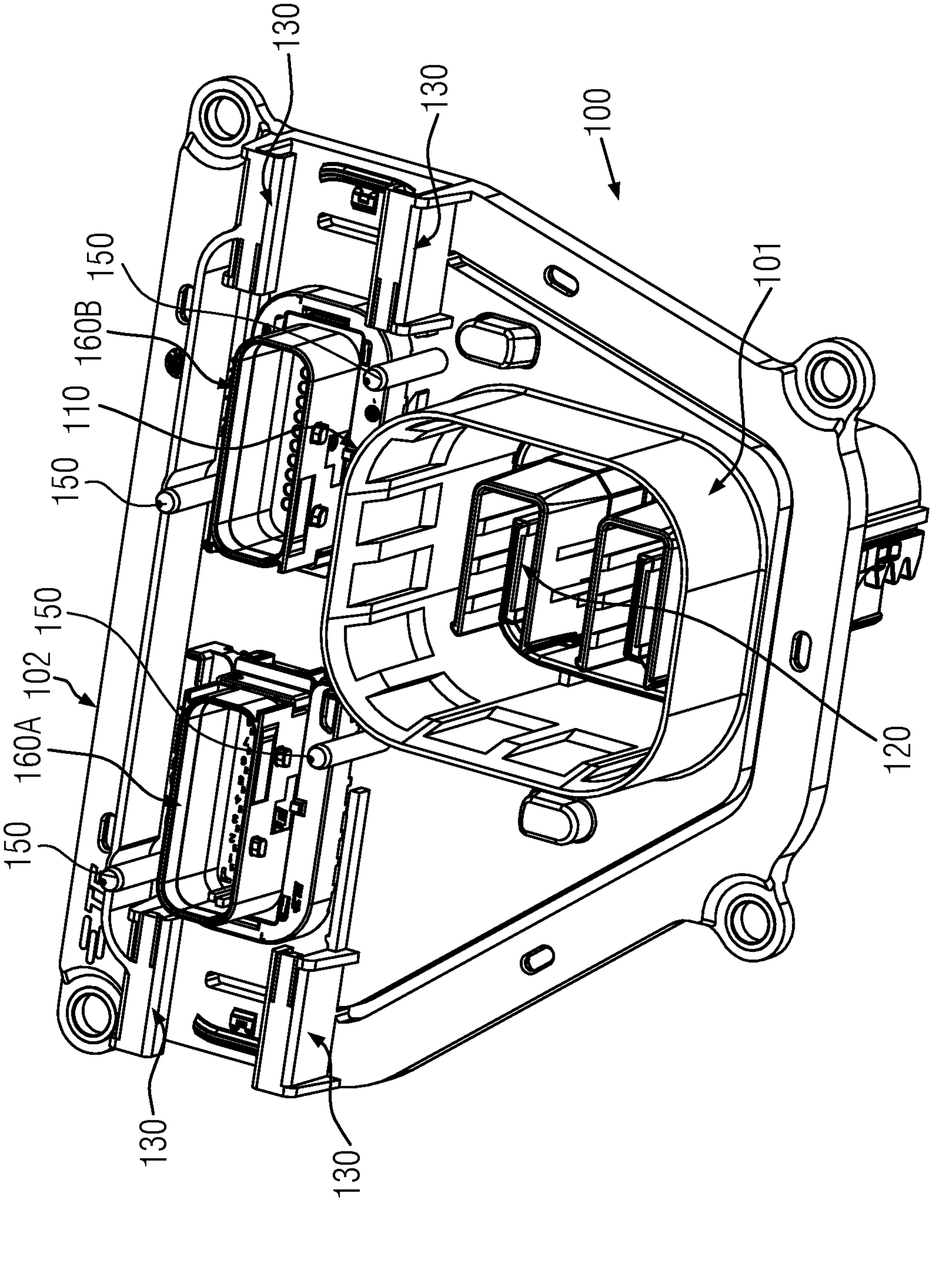
FIG. 1 schematically illustrates a three dimensional view of a main first connector according to an embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the present disclosure, a Cartesian reference system is used for describing the connectors and their displacement. For the sake of clarity, the insertion direction is referred to as the z-axis direction or z-direction and the displacement directions perpendicular to the insertion direction are referred to as the x-axis and y-axis directions or x-direction and y-direction. However, it is clear that the insertion direction could be along any other direction and the displacement directions could be any other directions perpendicular to the insertion direction.

FIG. 1 schematically illustrates a three dimensional view of the main first connector 100 according to an embodiment of the present invention. The main first connector 100 shown in FIG. 1 is a male connector 100, i.e., it comprises male electrical contacts. The main male connector 100 comprises a flange 102 from which the main body 101 of the male connector protrudes. The main body 101 has a first extremity 110 opposite to the flange 102. On the flange 102 of the main male connector 100, four projecting elements 130 are formed, which are configured to be inserted into corresponding recesses formed on a corresponding coupling frame in order to lock the male connector, a mating female connector and the frame itself in the assembled state, as will be described herein. While four projecting elements 130 are shown in FIG. 1, it should be understood that any number of projecting elements could be formed, for instance two, three, five or more. The main male connector 100 comprises a plurality of pins 120 for mating corresponding electrical terminals or holes of the female connector.

Two auxiliary first connectors 160A, 160B are formed on the flange 102 of the main male connector 100. The two auxiliary first connectors 160A, 160B of FIG. 1 are auxiliary male connectors. However, it should be understood that the two auxiliary first connectors 160A, 160B may also be female connectors. Moreover, even if two auxiliary first connectors 160A, 160B are illustrated in FIG. 1, it is clear that any number of auxiliary first connectors may be formed on the main male connector, for instance one, three, four, five or more.

The main male connector 100 further comprises a plurality of alignment pins 150 for fine or precise alignment of the two auxiliary first connectors 160A, 160B with corresponding auxiliary second connectors, as will be described in the following. While four alignment pins 150 are illustrated in FIG. 1, it is clear that any number of pins may be formed on the main male connector, for instance two, three, five or more. The alignment pins 150 are formed on the flange 102 of the main male connector 100.

Figure 2:
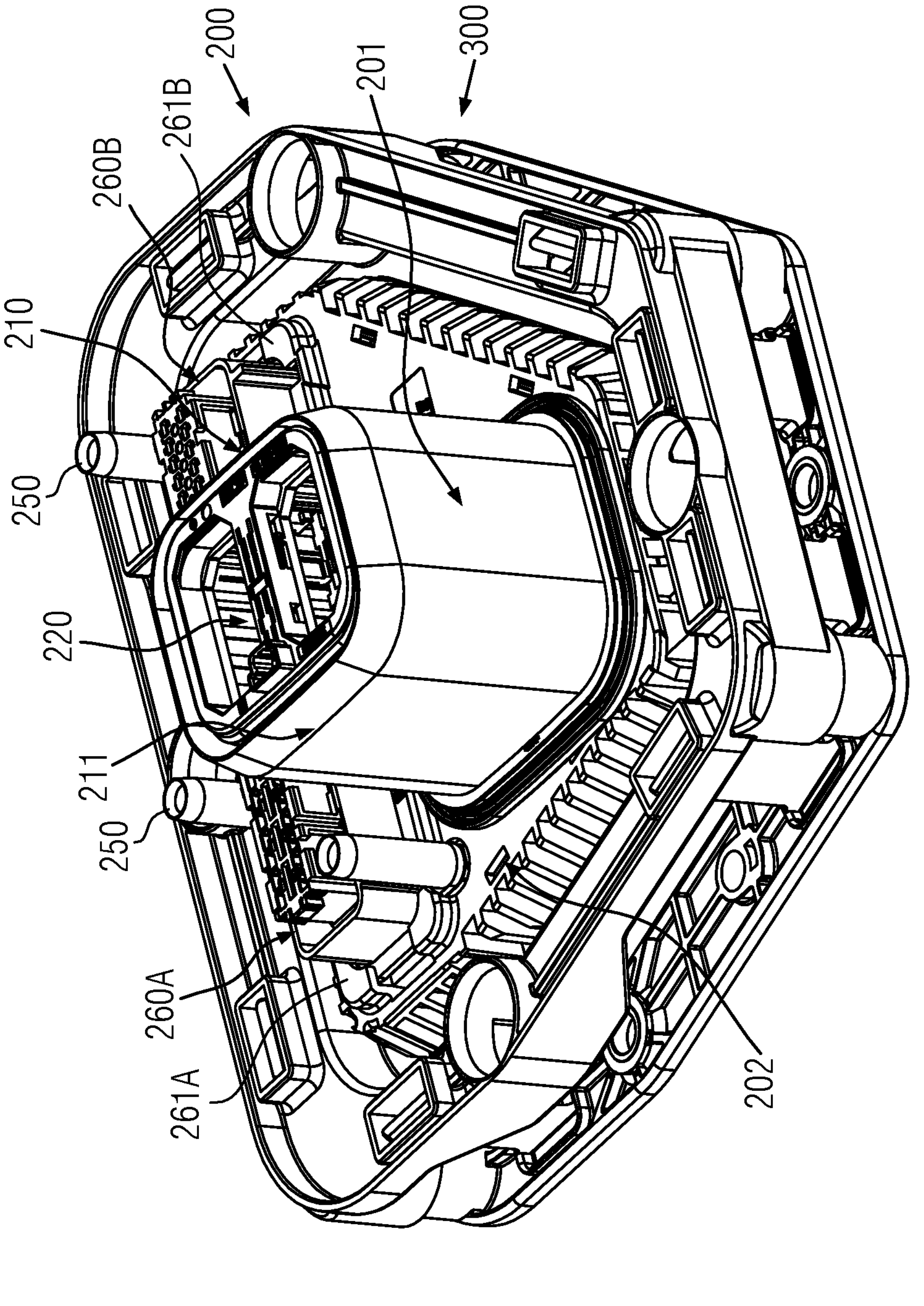
FIG. 2 schematically illustrates a three dimensional view of a main second connector according to an embodiment of the present invention.

FIG. 2 schematically illustrates a three dimensional view of the main second connector 200 according to an embodiment of the present invention. The main second connector 200 shown in FIG. 2 is a female connector. The main female connector 200 comprises a main body 201, which extends from a support element 202 between a first extremity connected to the support element 202 and a second extremity 210. The second extremity 210 has a beveled or slanted surface 211. A plurality of electrical terminals 220 is formed on the main female connector 200 for electrical connection with the corresponding electrical terminals of the main male connector 100.

Two auxiliary second connectors 260A, 260B are formed on the support element 202 of the main female connector 200. The two auxiliary second connectors 260A, 260B of FIG. 2 are auxiliary female connectors. However, the two auxiliary second connectors 260A, 260B may also be male connectors. Moreover, while two auxiliary second connectors 260A, 260B are illustrated in FIG. 2, any number of auxiliary second connectors may be formed on the main female connector, for instance one, three, four, five or more.

For the purposes of the present disclosure, the number of auxiliary first connectors is equal to the number of auxiliary second connectors, in order to form corresponding pairs of mating connectors. Moreover, it is necessary that, if the auxiliary first connectors are male connectors, then the auxiliary second connectors are female connectors and, vice versa, if the auxiliary first connectors are female connectors, then the auxiliary second connectors are male connectors. A configuration is also possible, wherein the auxiliary first connectors comprise one or more female connectors and one or more male connectors and, accordingly, the auxiliary second connectors comprise one or more male connectors and one or more female connectors, in order to form corresponding pairs of mating connectors.

The main female connector 200 further comprises a plurality of alignment holes 250 for fine alignment of the two auxiliary female connectors 260A, 260B with the corresponding auxiliary male connectors 160A, 160B, as will be described in the following. While four alignment holes 250 are illustrated in FIG. 2, any number of holes may be formed on the female connector, for instance two, three, five or more. A pair of the alignment holes 250 are mechanically connected to each auxiliary female connector 260A, 260B, so as to form a rigid structure that can slide on guiding means 261A, 261B. The support element 202 of the female connector 200 is mechanically connected to a coupling frame or compensation frame 300, which is shown in detail in the exploded view of FIG. 3.

Figure 3:
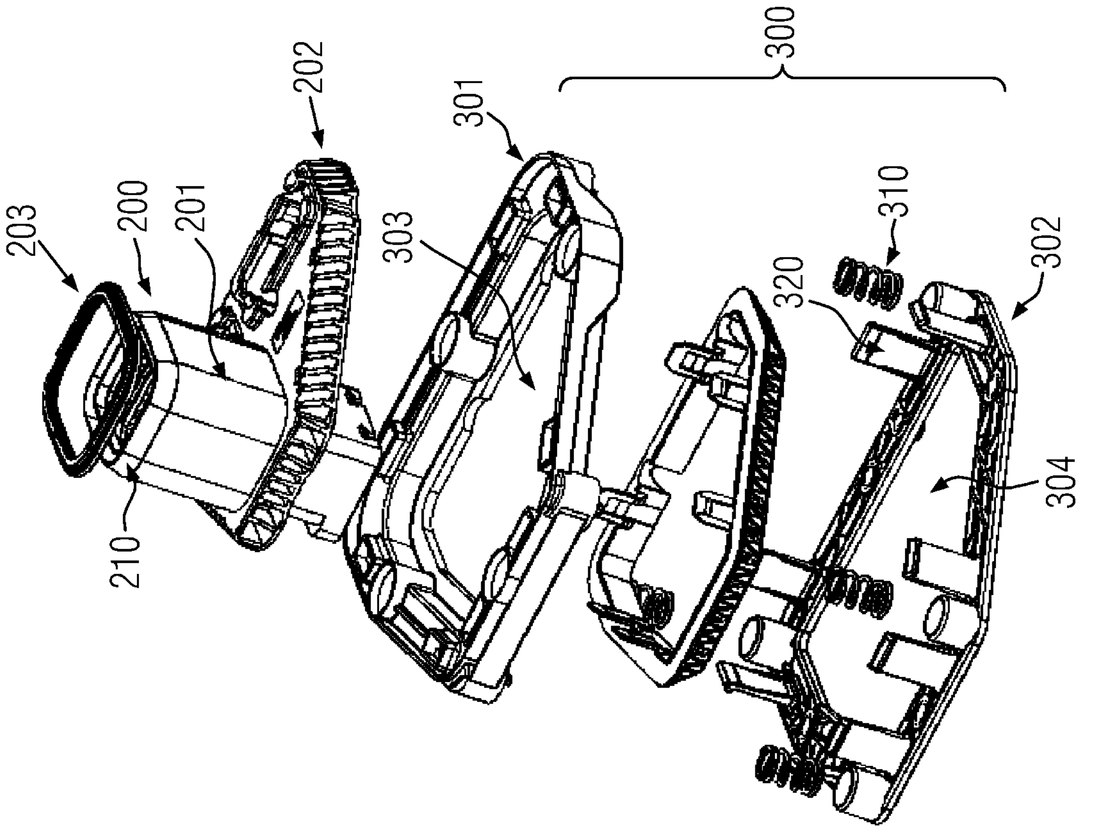
FIG. 3 schematically illustrates an exploded view of a main second connector according to an embodiment of the present invention.

FIG. 3 schematically illustrates an exploded view of the main female connector 200 and of the compensation frame 300, according to the embodiment of the present invention. In FIG. 3, the support element 202 and the main body 201 of the main female connector 200 are clearly visible. Moreover, FIG. 3 shows the damper element 203, which is coupled to the second extremity 210 of the main female connector 200 in order to reduce mechanical vibrations that may be transmitted between the main male and female connectors 100, 200 during usage of the blind connection system. The compensation frame 300 comprises a front component 301 and a rear component 302, which, in the assembled state, accommodate a plurality of elastic means, for instance springs 310. Preferably, four springs 310 are provided in the compensation frame 300. The front (301) and the rear (302) components of the compensation frame 300 are secured to one another by means of a plurality of retention elements 320. Preferably, two retention elements 320 are provided for each elastic means 310. Preferably, the retention elements 320 are located next to the elastic means 310. The retention elements 320 may be latching or hooking elements, or nose elements, as shown in FIG. 3. However, it is to be understood that any kind of retention elements may be used to keep the front and rear components 301, 302 of the compensation frame 300 secured together. The front component 301 is designed to have an opening 303 for accommodating the support element 202 of the main female connector 200. The rear component 302 is designed to have an opening 304 for accommodating an external connector. In this way, the compensation frame 300 may be used for mechanically connecting the main female connector 200 to an external connector.

Figure 4:
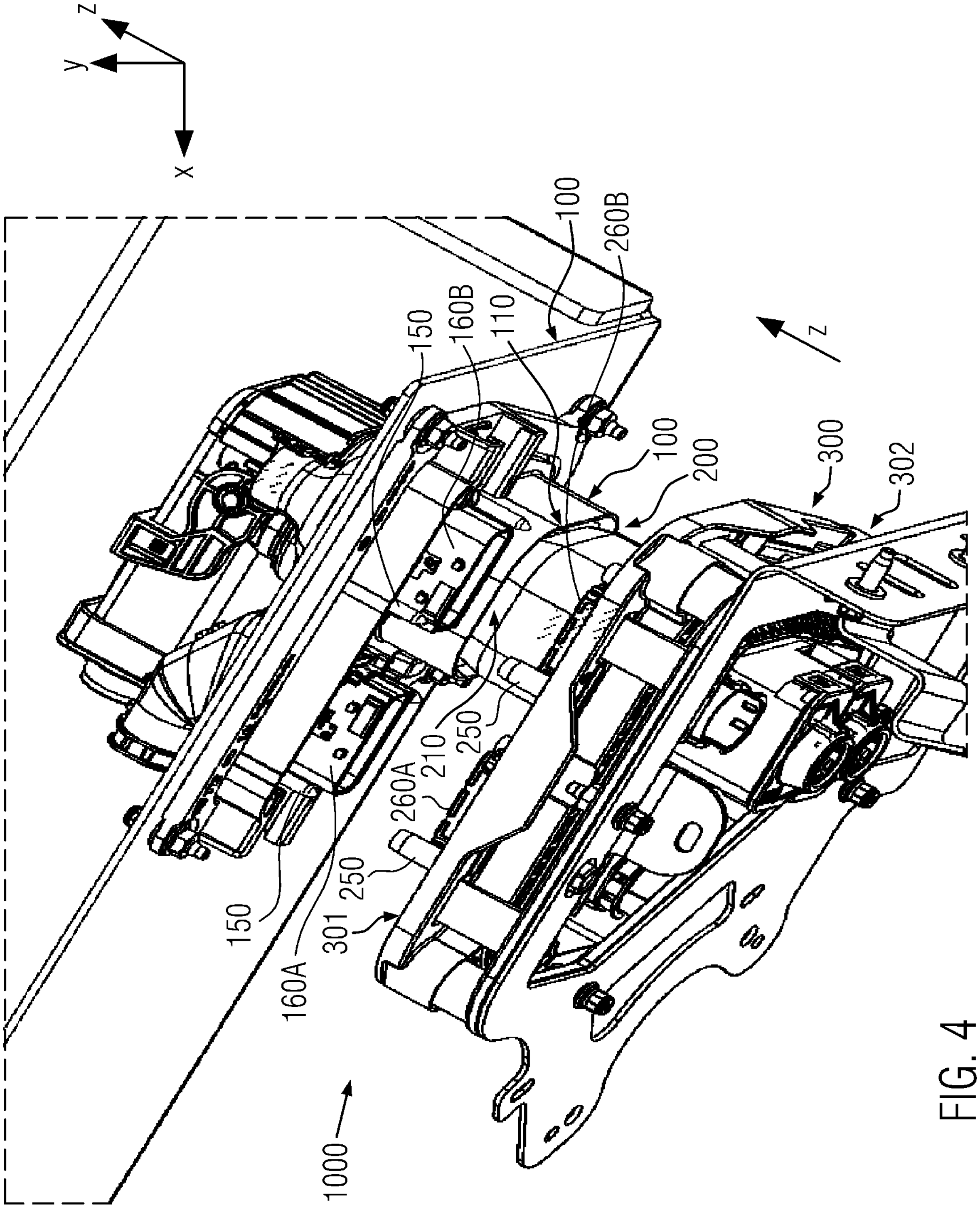
FIG. 4 schematically illustrates a three dimensional view of a blind connection system according to an embodiment of the present invention, during a first step of assembly.
Figure 5:
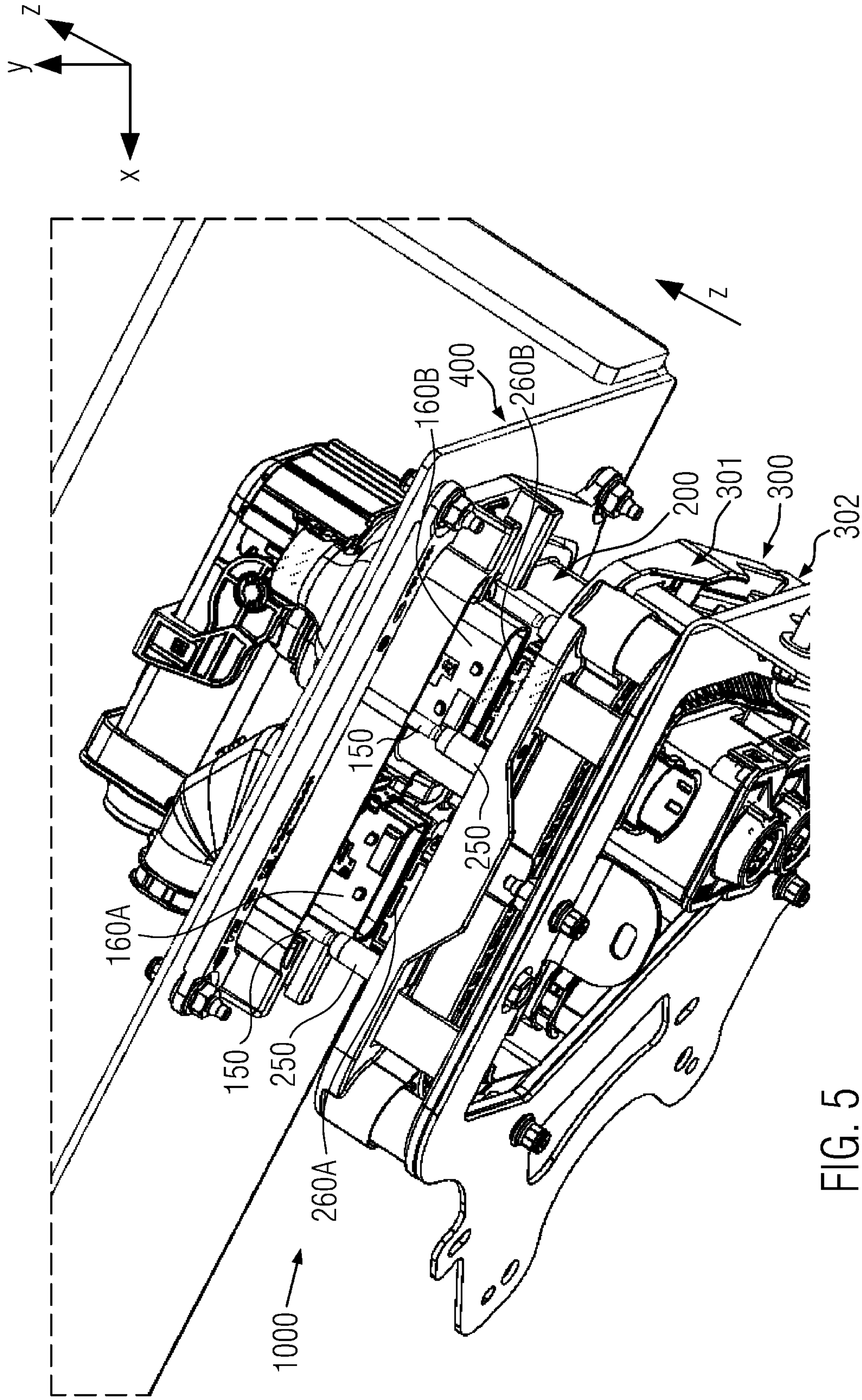
FIG. 5 schematically illustrates a three dimensional view of a blind connection system according to an embodiment of the present invention, during a further step of assembly.

The main male connector 100 and the main female connector 200 may be advantageously assembled to form a blind connection system 1000 as the ones shown in FIGS. 4 and 5. In particular, FIG. 4 schematically illustrates a three-dimensional view of the blind connection system 1000 in a preliminary assembly state and FIG. 5 schematically illustrates a three-dimensional view of the blind connection system 1000 in the assembled state. As it can be seen in FIGS. 4 and 5, each of the main male connector 100 and the female connector 200 may be connected to other electrical and mechanical components, so as to form a complex electrical and mechanical connection system. For instance, the main male connector 100 may be inserted into an opening of a container and may be partially covered by a wall 400.

The connection between the main male connector 100 and the main female connector 200 may be advantageously realized by means of an automated machine so as to avoid any intervention of human operators. In this case, it might be necessary to automatically, precisely align the main male connector 100 and the main female connector 200 along the insertion direction z and/or along the directions x and/or y perpendicular to the insertion direction z.

The particular structure and geometry of the main male and female connectors 100, 200 according to the present invention facilitates the formation of a blind connection and compensates for large misalignments along any directions, for instance misalignments of ±4 mm. This is achieved by designing the first extremity 110 of the main male connector 100 so as to have a beveled or slanted surface 111, preferably a slanted surface 111 including a chamfer, in order to guide the displacement of the main female connector 200 and to induce a coaxial alignment of the two main connectors 100 and 200 along the directions x and/or y perpendicular to the insertion direction z. On the other hand, the main female connector 200 is designed so as to have the first extremity 210 with the slanted surface 211 having a similar or equal slope with respect to the slanted surface 111 of the second extremity 110 of the main male connector 100. In this way, the displacement of the main female connector 200 along the x and/or y directions is favored and a coarse coaxial alignment of the main male connector and of the main female connector 200 can be obtained. A coarse coaxial alignment of the main male and female connectors 100, 200 along the x and/or y directions indicates that the two main connectors 100, 200 are fully aligned along the x and/or y directions, in order to ensure a stable and secure electrical connection between electrical contacts 120, 220.

A fine coaxial alignment along the x and/or y directions can be further obtained by inducing a minor displacement of the auxiliary female connectors 260A, 260B, once the alignment pins 150 of the main male connector 100 are inserted into the corresponding alignment holes 250 of the main female connector 200. Even in this case, the pins 150 are preferably designed so as to have an end with a slanted or chamfered surface that induces a minor displacement of the corresponding holes 250 formed on the main female connector 200. The holes 250 have a slanted surface having a similar or equal slope to the slanted surface of the pins 150, so as to favor the displacement of the holes 250 and, accordingly, of the auxiliary female connectors 260A, 260B mechanically connected to the holes 250. In this way, fine adjustment between the auxiliary connectors is obtained and the electrical connection between the electrical contacts of the auxiliary male connectors 160A, 160B and the corresponding auxiliary female connectors 260A, 260B is ensured.

Figure 6:
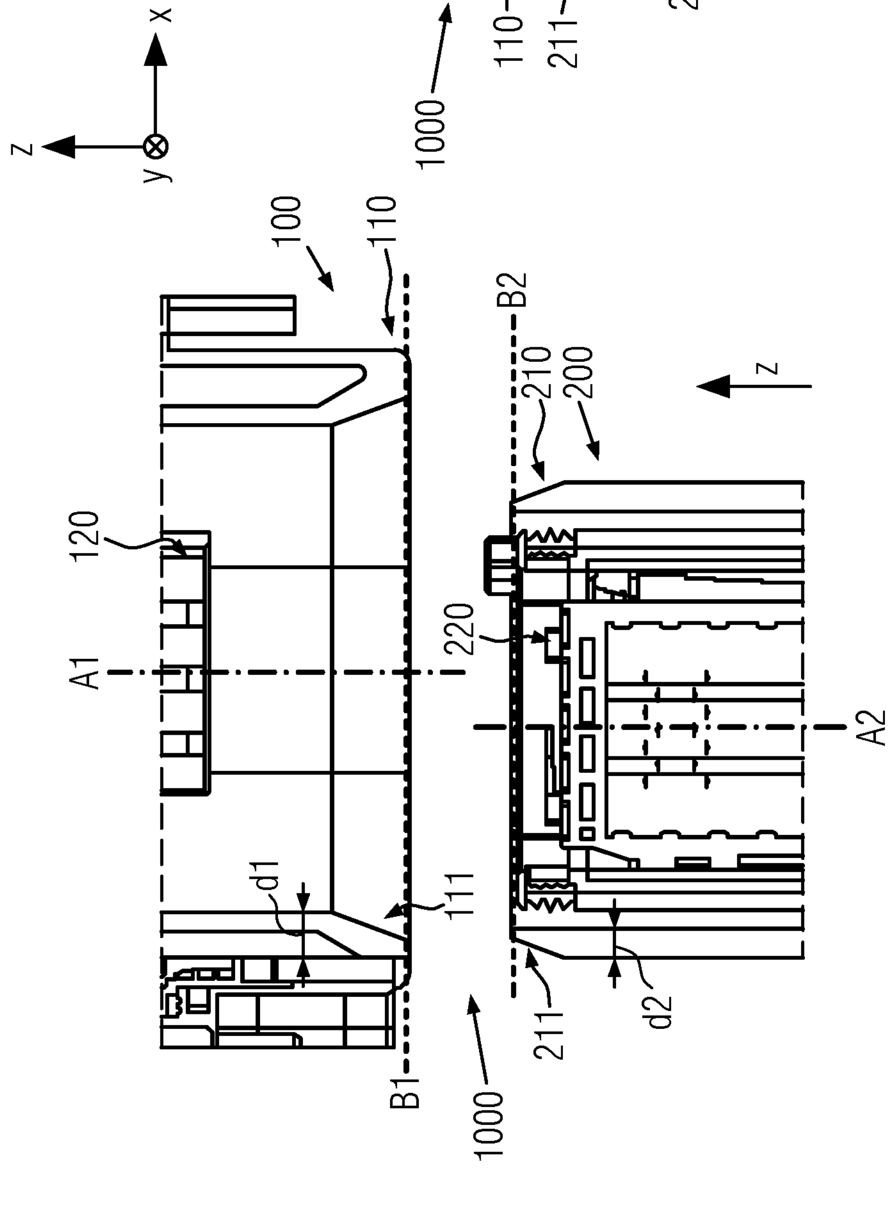
FIG. 6 schematically illustrates a first step of assembly of a main first connector and a main second connector for forming a blind connection, according to an embodiment of the present invention.
Figure 8:
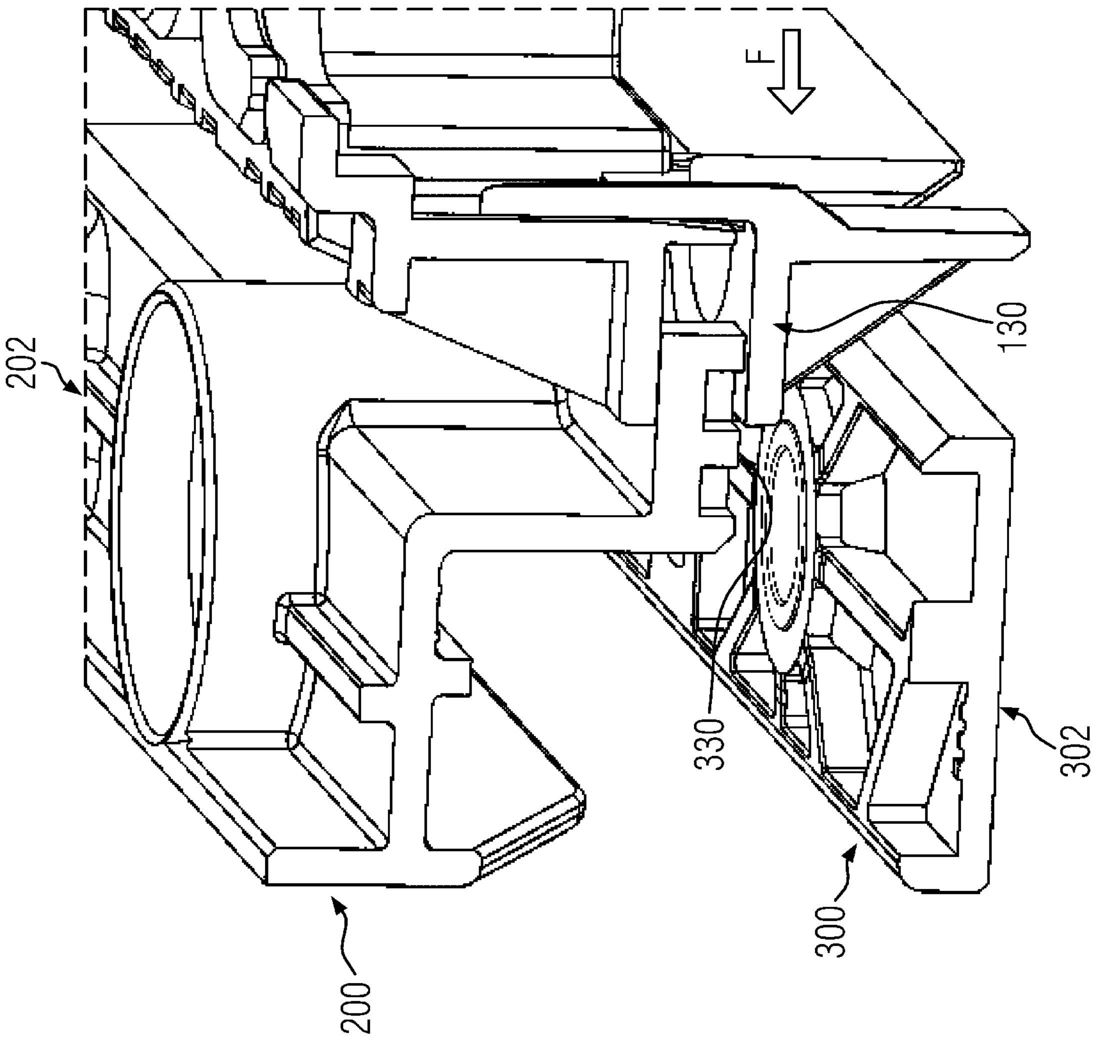
FIG. 8 schematically illustrates a three dimensional view of a detail of the coupling between the main first connector and the compensation frame, according to an embodiment of the present invention.

The method for realizing the blind connection between the main male connector 100 and the main female connector 200 according to the present invention is described in more detail with reference to FIGS. 6-13. FIG. 6 schematically illustrates a two dimensional view of the main male connector 100 and the female connector 200 during the approaching step. As can be seen in the figure, the main axis A1 of the main male connector 100 and the main axis A2 of the main female connector 200 are not aligned along the x-direction. The main axis A1 of the main male connector 100 and the main axis A2 of the main female connector 200 may not be aligned also along the y-direction. As a consequence of the misalignment of the main axes A1 and A2 along the x and/or y directions, when the main female connector 200 approaches the main male connector 100 by being pushed along the insertion direction, at least a portion of the slanted surface 211 of the main female connector 200 contacts a portion of the slanted surface 111 of the first extremity 110 of the main male connector 100.

FIG. 6 shows also the axis B1 delimiting the edge of the main male connector 100 and the axis B2 delimiting the edge of the main female connector 200. The axes B1 and B2 are parallel in the configuration shown in FIG. 6; accordingly, there is no misalignment between the two main connectors along the z-direction. In the configuration (not shown) wherein the axes B1 and B2 are not parallel, the two main connectors 100, 200 are misaligned along the z-direction and there is a need to correct this misalignment, as described in the following.

Moreover, FIG. 6 shows the first slanted surface 111 comprising a chamfered tip; the thickness of the first slanted surface 111 at maximum distance from the tip is indicated as d1 in the figure. In a similar way, the second slanted surface 211 comprises a chamfered tip; the thickness of the second slanted surface 211 at maximum distance from the tip is indicated as d2 in FIG. 6. Preferably, the thickness d1 is equal to d2. Preferably, the thicknesses d1 and d2 are in a range between 2 mm and 3 mm, even more preferably equal to 2.5 mm, when misalignments in the order of 4 mm must be compensated for.

Figure 7:
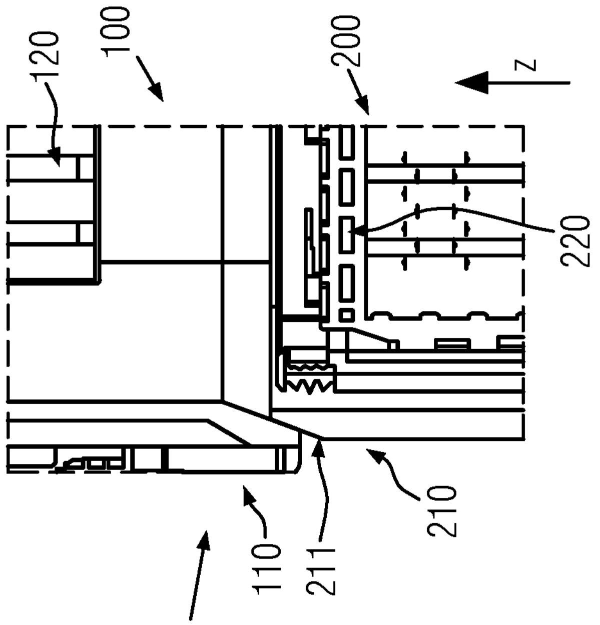
FIG. 7 schematically illustrates a further step of assembly of a main first connector and a main second connector for forming a blind connection, according to an embodiment of the present invention.

As represented in FIG. 7, when the main female connector 200 is further moved toward the main male connector 100 along the insertion direction z, the slanted surface 211 of the main female connector 200 slides along the slanted surface 111 of the main male connector 100 and generates a first force F1 having one or more components perpendicular to the insertion direction z, i.e., one or more components along the x and/or y axes. The first force F1 induces a displacement of the main female connector 200 in a direction parallel to the force. For instance, still with reference to FIG. 7, a displacement along the x-axis is induced. For example, the displacement of the main female connector 200 may be along the x- and/or y-axes. Preferably, the displacement of the main female connector 200 may be along both the x- and y-axes. The first force F1 may hence act on the main female connector 200 so as to tilt it and reduce the angle formed between the main axes A1 and A2 of the main male and female connectors 100 and 200, respectively. The displacement of the main female connector 200 can compensate for any misalignments of the main axes A1 and A2 along the x- and/or y-axis, for instance large misalignments, such as misalignments of ±4 mm along the x- and/or y-axis. During displacement of the main female connector 200, the main male connector 100 is fixed and remains in the same position.

As shown in FIG. 3, the main female connector 200 is coupled to the compensation frame 300; therefore, during displacement of the main female connector 200, the compensation frame 300 is also displaced. The displacement of the compensation frame 300 ensures locking with the main male connector 100, as explained in the following. The projecting portions 130 formed on the flange 102 of the main male connector 100 are initially partially accommodated into corresponding recesses 330 formed on the compensation frame 300. During displacement of the main female connector 200, the recesses 330 are displaced as a consequence of the displacement of the compensation frame 300 and the projecting portions 130 are further inserted within the recesses 330. At the end of the displacement, the projecting portions 130 lock the main male connector 100 to the compensating frame 300. This mechanism hence represents an additional locking feature for the blind connection system 1000. The length of the projecting portions 130 and of the recesses 330 must be designed so as to enable displacement of the main female connector 200 and of the compensation frame 300 during the alignment process, for instance they must be designed so as to enable a displacement of 4 mm in case of a large initial misalignment. The projecting portions 130 engaged with the recesses 330 are shown in detail in FIG. 8.

Figure 9:
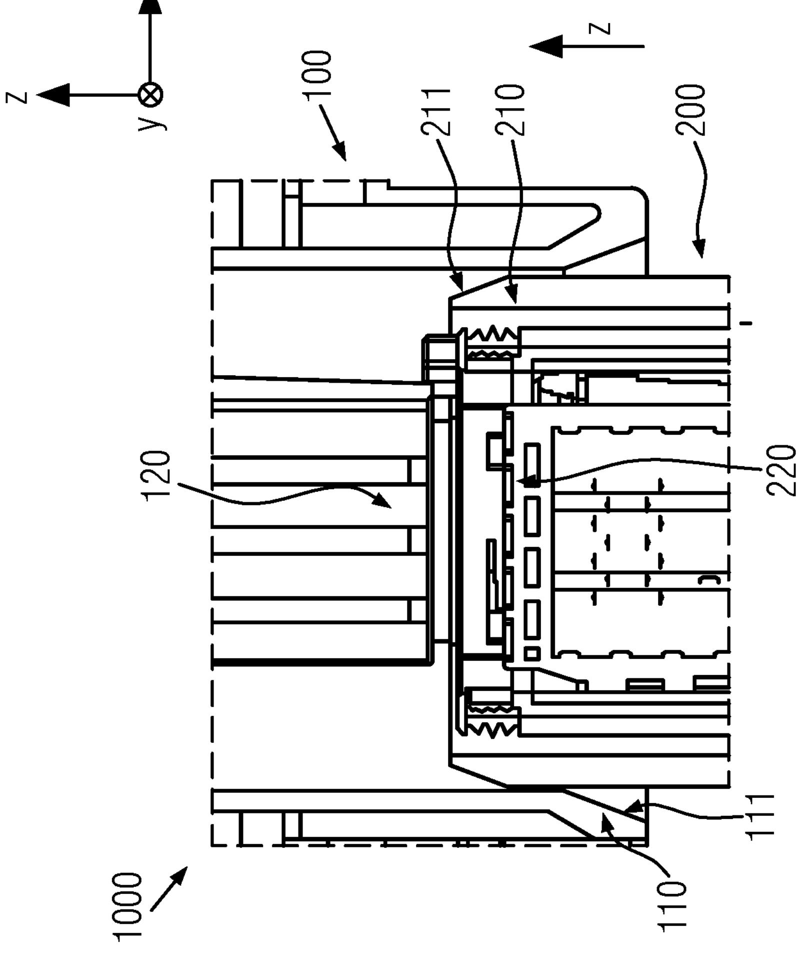
FIG. 9 schematically illustrates a further step of assembly of a main first connector and a main second connector for forming a blind connection, according to an embodiment of the present invention.

As shown in FIG. 9, after displacement of the main female connector 200 along the x- and/or y-directions as a result of the effect of the first force F1, a course alignment of the main axes of the main male connector 100 and of the main female connector 200 along the x- and/or y-axes is obtained. The main female connector 200 may hence be inserted into the main male connector 100 so as to connect mating electrical contacts.

A fine alignment of the pins 150 and the holes 250 and, accordingly, of the auxiliary connectors 160A, 160B, 260A, 260B along the x- and/or y-axes is further obtained by coupling the alignment pins 150 of the main male connector 100 with the corresponding alignment holes 250 of the main female connector 200. The alignment pins 150 are formed on the flange 102 of the main male connector 100. The alignment holes 250 are mechanically coupled to the auxiliary female connectors 260A, 260B.

During the first step of fine alignment, the pins 150 are inserted into the holes 250. The pins 150 and the holes 250 are designed so as to have slanted surfaces at their ends, like the main body of the main male and female connectors 100, 200, respectively. Thanks to their slanted surfaces, each pin 150 slides into the corresponding hole 250 and generates a second force F2 having one or more components perpendicular to the insertion direction z, i.e., one or more components along the x and/or y axes. The second force F2 induces a displacement of the holes 250 in a direction parallel to the force. For instance, the displacement of the holes 250 may be along the x- and/or y-axes. Preferably, the displacement of the holes 250 may be along both the x- and y-axes. The magnitude of the second force F2 is preferably lower than the magnitude of the first force F1 and the displacement induced by the second force F2 during fine alignment is preferably lower than the displacement induced by the first force F1 during coarse alignment. Since the holes 250 are mechanically connected to the auxiliary female connectors 260A, 260B, during displacement of the holes 250, the auxiliary female connectors 260A, 260B are also displaced along the x and/or y direction of the same amount of displacement. Accordingly, when the holes 250 reach alignment with the corresponding pins 150, the auxiliary female connectors 260A, 260B are also aligned with the corresponding auxiliary male connectors 160A, 160B. When alignment is obtained, the auxiliary female connectors 260A, 260B are electrically connected to the auxiliary male connectors 160A, 160B.

Each auxiliary female connector 260A, 260B is displaced along guiding means 261A, 261B formed on the support element 202 of the main female connector 200. The support element 202, the main body 201 and the electrical terminals 220 are not displaced during displacement of the auxiliary female connectors 260A, 260B. Accordingly, the electrical connection between the main male and female connectors 100, 200 is not affected by the fine alignment between the auxiliary male and female connectors 160A, 160A, 260A, 260B. Preferably, the displacement of each auxiliary female connector 260A, 260B is independent from the other auxiliary female connectors 260A, 260B.

Figure 10:
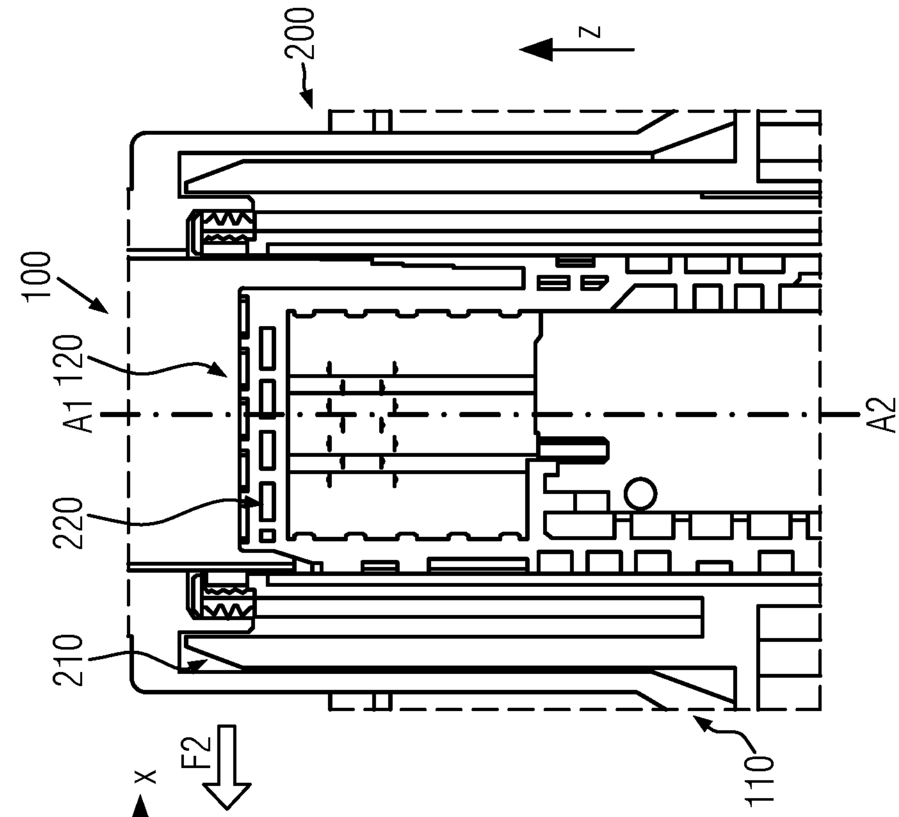
FIG. 10 schematically illustrates a two dimensional view of a blind connection system in the assembled configuration, according to an embodiment of the present invention.

As a result of the steps of coarse coaxial alignment and fine coaxial alignment, the main male and female connectors 100, 200 and the auxiliary male and female connectors 160A, 160B, 260A, 260B are aligned along the x- and y-axes and the main axes A1 and A2 are coincident. The electrical connection between the two connectors 100, 200 is hence obtained, as shown in FIG. 10. After the coarse and fine coaxial alignment along the x- and/or y-axes, there may still be a need to adjust the position of the main male and female connectors 100, 200 along the insertion direction z. The compensation frame 300 provided with the elastic means 310 can be used to correct this non-correct positioning, as will be described in the following, with reference to FIGS. 11-13.

Figures 11, 11A:
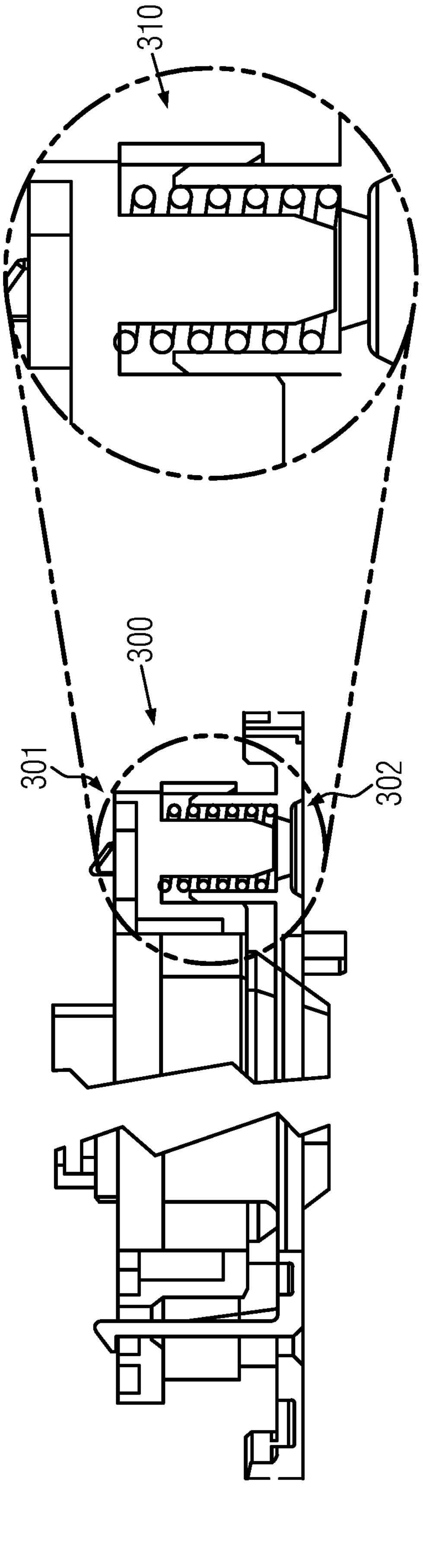
FIG. 11 schematically illustrates a two dimensional view of a compensation frame with elastic means, according to an embodiment of the present invention.
FIG. 11A schematically illustrates a detail of the elastic means in the rest configuration, according to an embodiment of the present invention.
Figure 13:
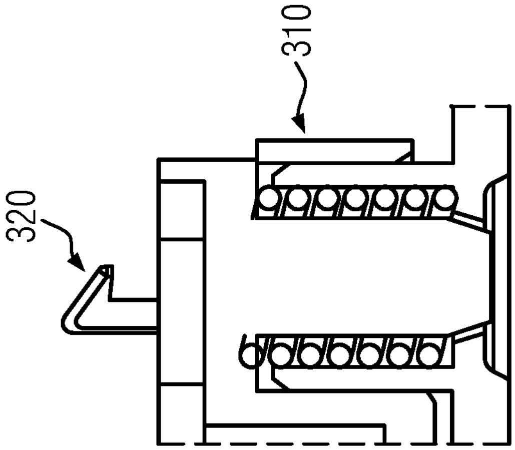
FIG. 13 schematically illustrates a detail of the elastic means in the compressed configuration, according to an embodiment of the present invention.
Figure 12:
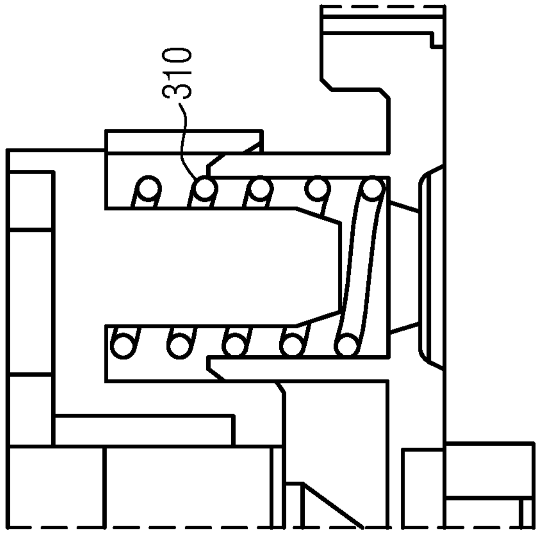
FIG. 12 schematically illustrates a detail of the elastic means in the elongated configuration, according to an embodiment of the present invention.

FIG. 11 schematically illustrates a lateral view of the compensation frame 300, wherein the springs 310 are in the rest configuration. In particular, FIG. 11A schematically illustrates a detail of the spring 310 in the rest configuration. In a preferred configuration, the main female connector 200 coupled to the compensation frame 300 is inserted into the main male connector 100. When the compensation frame 300 is coupled to the main female connector 200, the springs 310 are in the rest configuration of FIG. 11. After mating of the electrical contacts of the main male and female connectors 100, 200, the springs 310 may elongate (as schematically illustrate in FIG. 12) or compress (as schematically illustrate in FIG. 13) in order to allow tilting of the compensation frame 300 and the main female connector 200 with respect to the z-axis. In this way, the compensation frame 300 compensates for any non-parallelism between the main male connector 100 and the main female connector 200, for example variances of ±4 mm. According to a preferred example, one or more springs 310 of the compensation frame 300 may elongate and one or more springs 310 may simultaneously compress in order to induce a tilt of the compensation frame 300 with respect to the z-axis. The compensation frame 300 is advantageously designed so that, as a consequence of the adjustment of the position of the compensation frame 300 with respect to the main male connector 100 and the main female connector 200, the electrical connection between the electrical terminals 120 of the male connector and 220 of the female connector is not damaged.

It is to be understood that the steps of alignment along each axis x, y or z are independent from each other and that, depending on the different situations, it may be necessary to recover a misalignment along a single axis x, y or z or any combination thereof. For instance, it may be necessary to recover a misalignment of the main male and female connectors 100, 200 along the x-axis and/or the y-axis. Accordingly, a blind connection system 1000 may be provided wherein the main male and female connectors 100, 200 are provided with slanted surfaces 111, 211 so as to obtain the blind alignment along the x- and/or y-axes as described above. For instance, it may be necessary to recover a non-correct positioning of the main male and female connectors 100, 200 only along the z-axis. Accordingly, a blind connection system 1000 comprising the compensation frame 300 with elastic means 310 may be provided. For instance, it may be necessary to recover a misalignment of the main male and female connectors 100, 200 along the x-axis and the y-axis and a non-correct positioning along the z-axis. Accordingly, a blind connection system 1000 may be provided, wherein the main male and female connectors 100, 200 are provided with slanted surfaces 111, 211 and wherein a coupling frame 300 with elastic means 310 is further connected to the main male and female connectors 100, 200. Preferably, a precise and secure connection between the male and female connectors is obtained when the two connectors are aligned along all x-, y- and z-axes.

Figure 14:
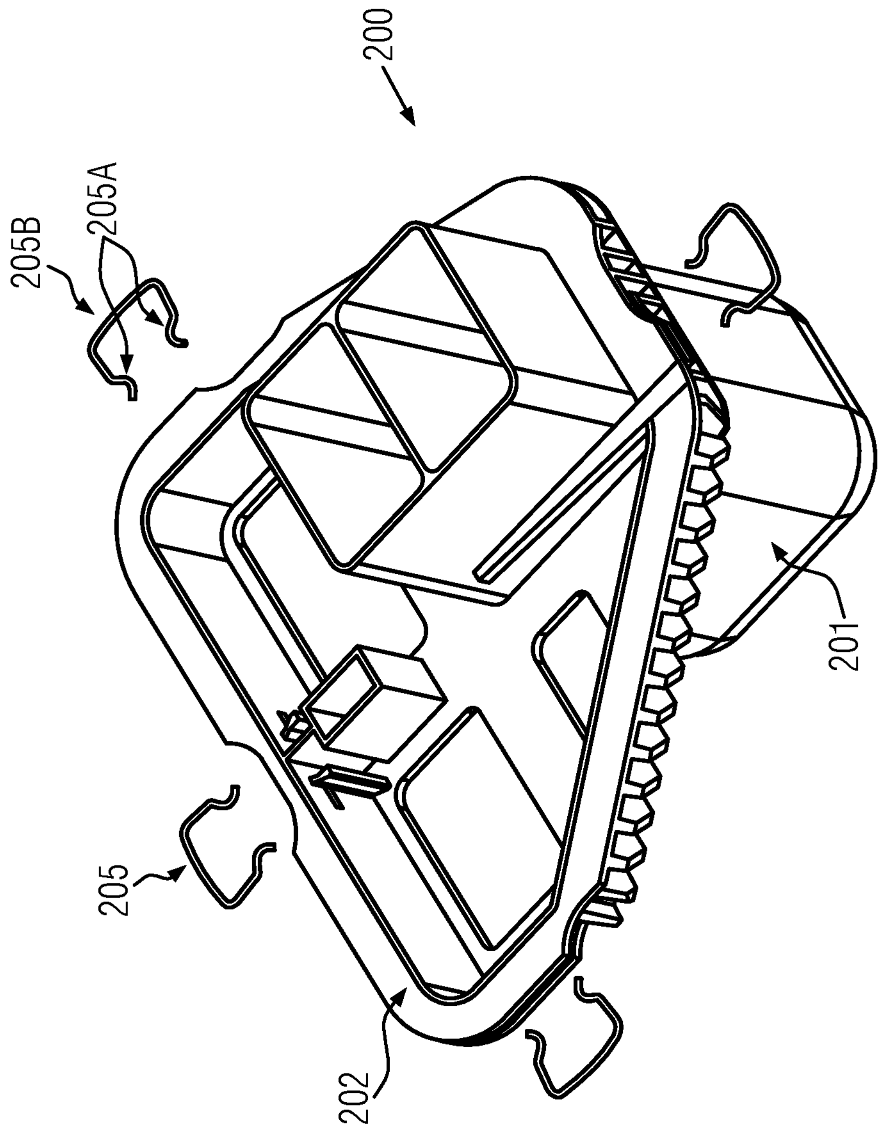
FIG. 14 schematically illustrates a three-dimensional view of a main second connector comprising centering elastic elements, according to another embodiment of the present invention.

FIG. 14 schematically illustrates an advantageous configuration of the main female connector 200 further comprising centering elastic elements 205 for adjusting the position of the main female connector 200 when assembled with the compensation frame 300. Preferably, the centering elastic elements 205 are centering spring clips. According to a preferred configuration, each spring clip 205 comprises a wire bent to have a U-shape and having a head 205B and two lateral arms 205A. In the preferred embodiment of FIG. 14, the main female connector 200 is provided with four centering spring clips 205, which are symmetrically placed on the edges of the main female connector 200. However, it is clear that any other number of centering elastic elements 205 could be provided, for instance two, three, five, six, seven or more. In this case, the main female connector 200 can be provided with more or less centering spring clips 205, which are not symmetrically placed on the edges of the main female connector 200. The centering spring clips 205 are advantageously added to the main female connector 200 to help self-centering of the connector when assembled to the compensation frame 300. Moreover, the centering spring clips 205 help keeping the main female connector 200 fixed and stable in the assembled configuration. The working principle of the centering spring clips 205, accommodated into the corresponding seats 206, is schematically shown in FIGS. 15A to 15D.

Figures 15A, 15B, 15C, 15D:
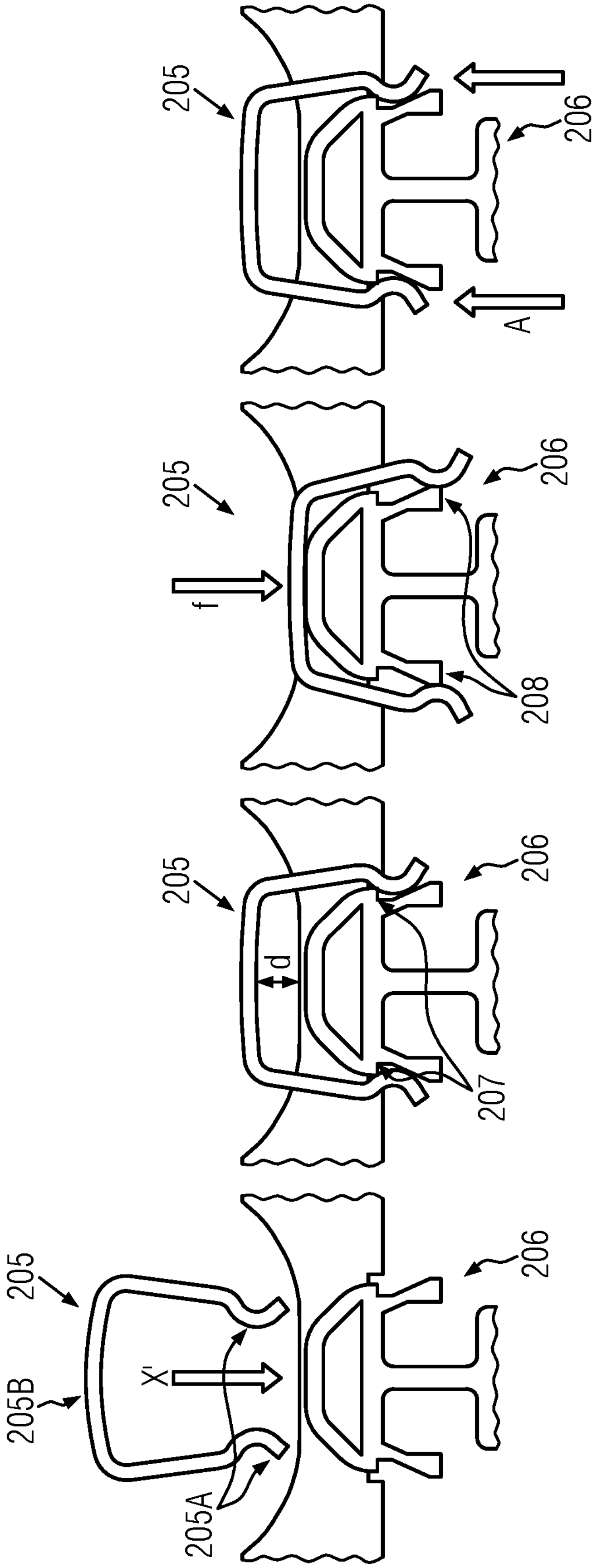
FIG. 15A schematically illustrates a first step of use of the centering elastic element, according to an embodiment of the present invention.
FIG. 15B schematically illustrates a further step of use of the centering elastic element, according to an embodiment of the present invention.
FIG. 15C schematically illustrates a further step of use of the centering elastic element, according to an embodiment of the present invention.
FIG. 15D schematically illustrates a further step of use of the centering elastic element, according to an embodiment of the present invention.

FIG. 15A schematically illustrates a first step of use of the centering spring clips 205, wherein a single spring clip 205 is inserted into the corresponding seat 206 along the direction X'. FIG. 15B schematically illustrates a further step of use, wherein the centering spring clip 205 is retained in the corresponding seat 206 by means of the seat protrusions 207. In this rest configuration, the lateral arms 205A of the spring clip 205 are supported by the seat protrusions 207 and the head 205B of the spring clip 205 remains at a distance d from the seat 206. Preferably, the distance d corresponds to 4 mm. FIG. 15C schematically illustrates a further step of use, wherein an external force f, parallel to the X' direction, is applied to the centering spring clip 205. When the external force f is applied, the lateral arms 205A of the centering spring clip 205 slide along the slated surfaces 208 of the seat 206 and the head 205B of the centering spring clip 205 reaches the external surface of the seat 206. During application of the external force, the centering spring clip 205 remains in the elastic condition without permanent deformation. The external force can be modulated by the angle of the slated surfaces 208. The external force f can be applied, for instance, as a consequence of a contact of the main female connector 200 with the inner walls of the compensation frame 300, as will be described below. Finally, FIG. 15D schematically illustrates a further step of use of the centering spring clips 205, wherein the external force f is no longer applied and the centering spring clip 205 returns to the rest configuration. During this step, the lateral arms 205A of the centering spring clip 205 slide backwards along the slanted surfaces 208, as schematically indicated by the arrow A in FIG. 15D, and the head 205B is separated from the external surface of the seat 206.

Figure 16:
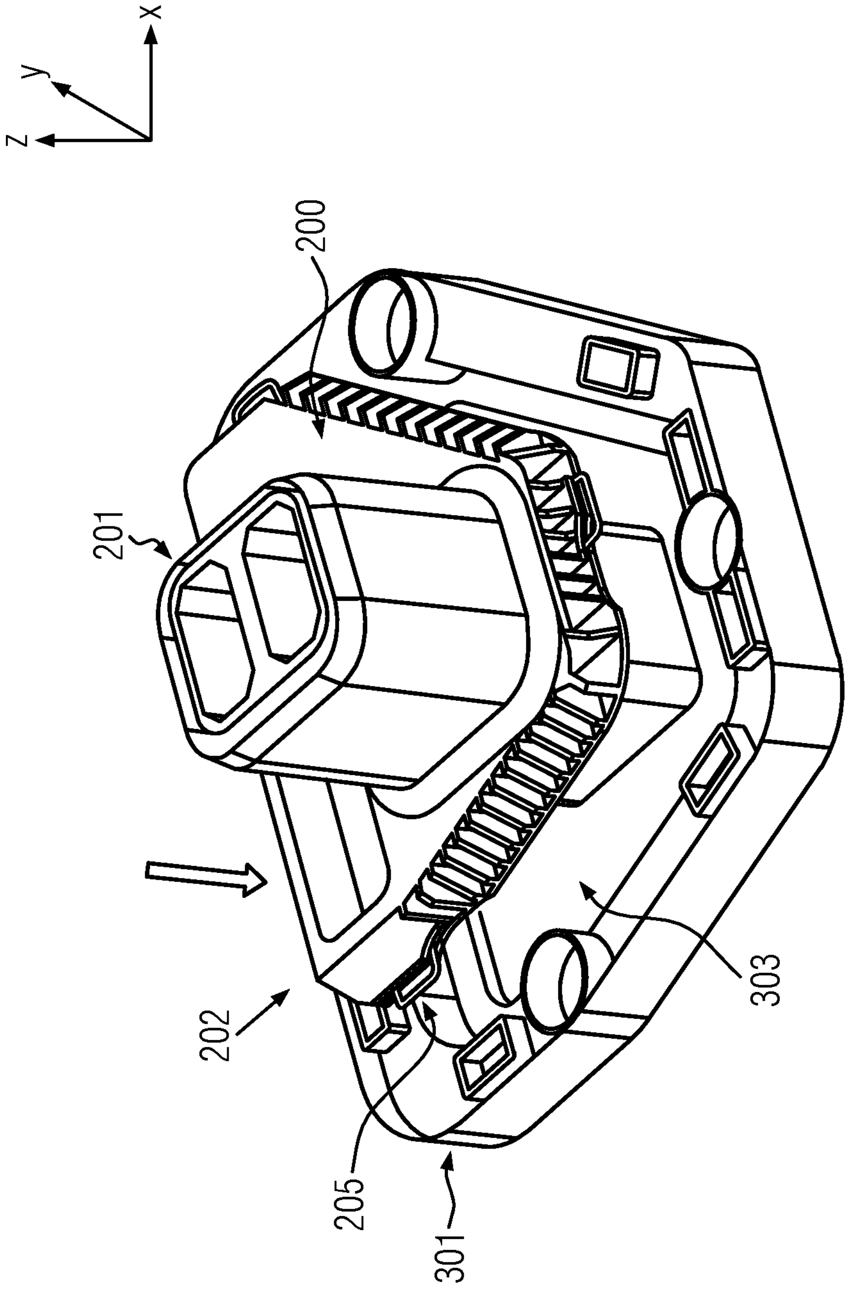
FIG. 16 schematically illustrates the assembly of the second main connector comprising centering elastic elements with the front component of the compensation frame, according to an embodiment of the present invention.

As schematically illustrated in FIG. 16, the main female connector 200 provided with the centering spring clips 205 is inserted into the opening 303 of the front component 301 of the compensation frame 300 along an insertion direction parallel to the z-axis.

Figure 17B:
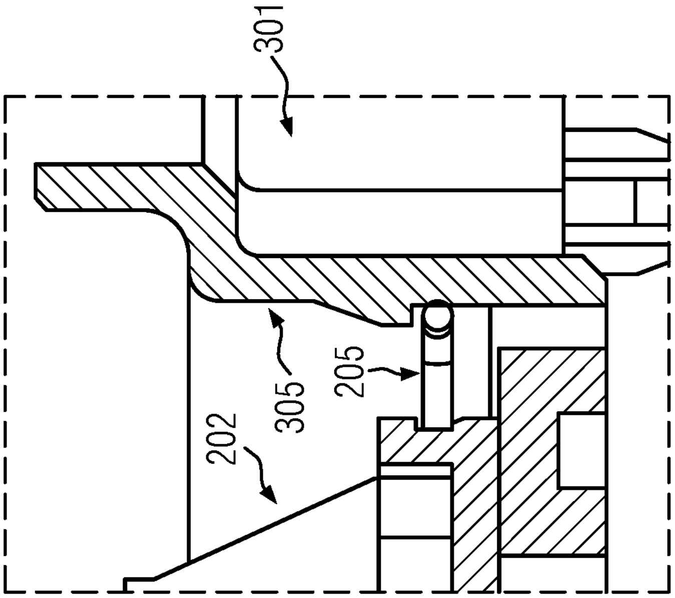
FIG. 17B schematically illustrates a detail of the second main connector comprising centering elastic elements assembled with the front component of the compensation frame, according to an embodiment of the present invention.
Figure 17A:
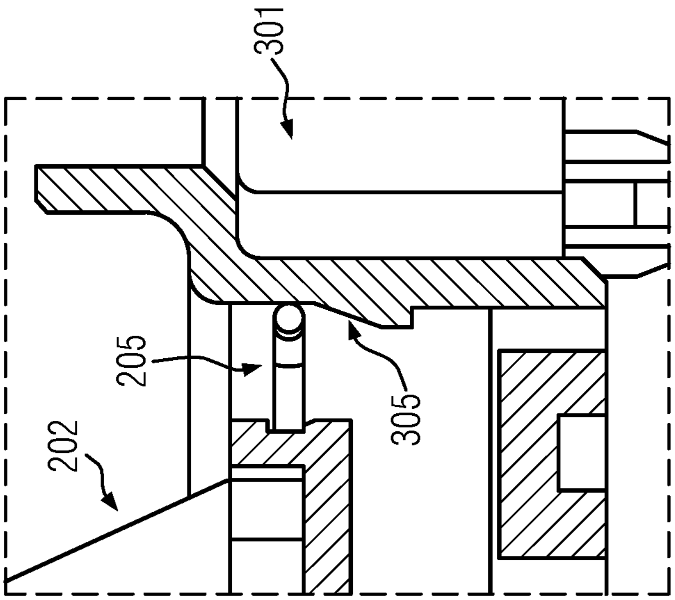
FIG. 17A schematically illustrates a detail of the second main connector comprising centering elastic elements preassembled with the front component of the compensation frame, according to an embodiment of the present invention.

In a pre-assembled configuration, which is shown in FIG. 17A, the head 205B of the spring clip 205 contacts the inner wall 305 of the front component 301 of compensation frame 300. In fact, as explained with reference to FIG. 15B, after insertion in the corresponding seat 206, the centering spring clip 205 is in a rest state with the head 205B being spaced from the external wall of the seat 206 by a distance d. When the main female connector 200 is further pushed and inserted into the front component 301 of the compensation frame 300, the centering spring clip 205 slides along the inner wall 305 of the front component 301 of the compensation frame 300. Since the inner wall 305 comprises a portion that is slightly slanted towards the inside of the front component 301, the centering spring clip 205 deforms and compresses during insertion, as a consequence of the external force applied by the slanted inner wall 305 during sliding.

Finally, when the insertion process is completed, the centering spring clip 205 returns to the rest state and gets blocked by a lower edge of the inner wall 305, as schematically shown in FIG. 17B. During this restoration step, each centering spring clip 205 applies a counter-force against the inner wall 305 of the front component 301 of the compensation frame 300 and the main second connector 200 self-centers with respect to the compensation frame 300. In particular, the centering spring clips 205 are advantageously symmetrically placed along the perimeter of the main female connector 200, in order to apply symmetric counter-forces and to induce centering of the connector 200 with respect to the compensation frame 300. The centering spring clips 205 can be advantageously employed also during the assembly of the main female connector 200 with the main male connector 100, as explained with reference to FIGS. 18 and 19.

Figure 18:
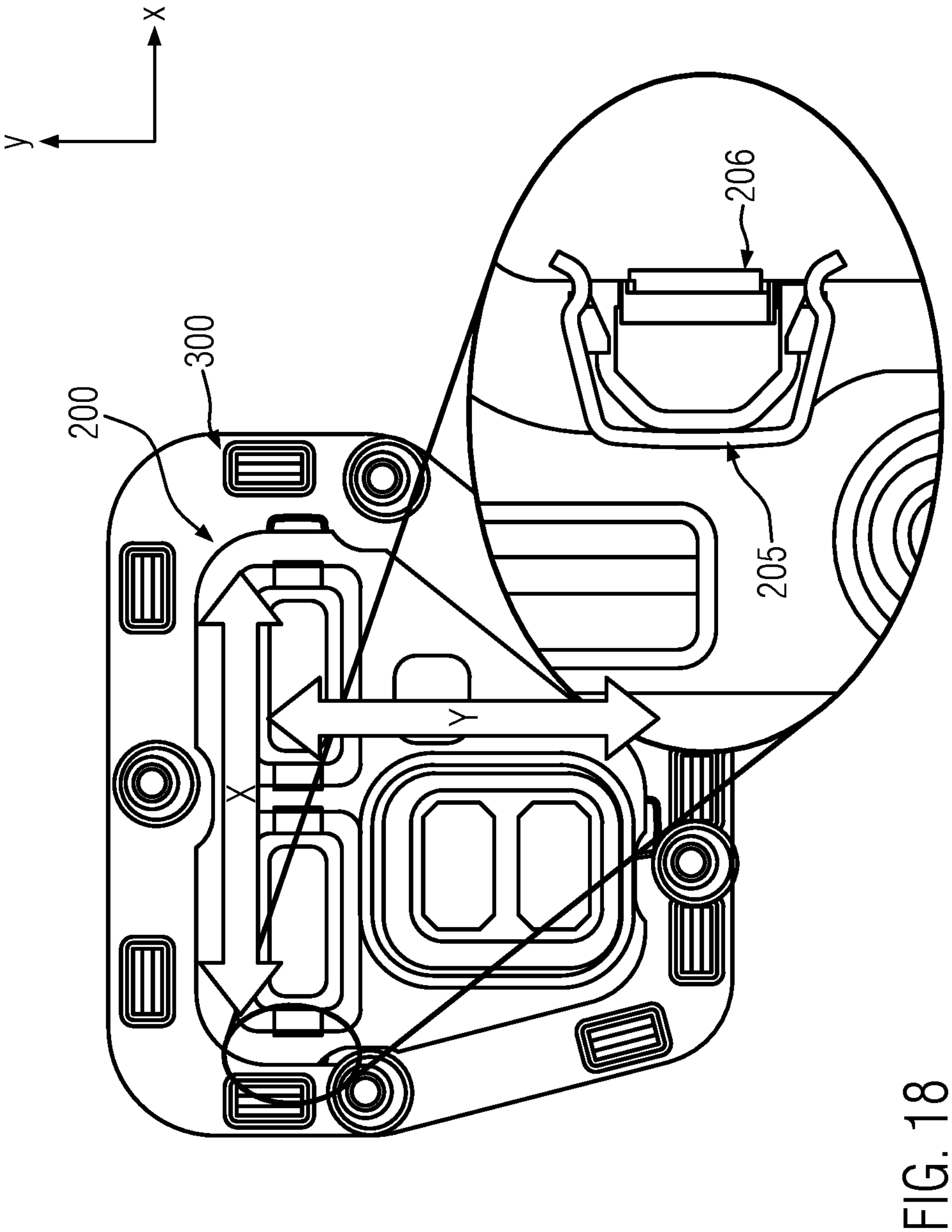
FIG. 18 schematically illustrates a top view of a configuration of the second main connector comprising centering elastic elements assembled with the front component of the compensation frame, for assembly with the main male connector, according to an embodiment of the present invention.

FIG. 18 schematically illustrates a configuration of the main female connector 200 with the centering spring clips 205, during assembly with the main male connector 100 (which is not shown for better clarity). As explained in detail above, during mating of the two main connectors 100 and 200, the main female connector 200 is displaced along the x- and y-directions to compensate for misalignments. As a consequence of the displacement of the main female connector 200 along the x- and y-directions, the centering spring clips 205 are also displaced. For instance, when the main female connector 200 is displaced along the x-direction, each centering spring clip 205 may deform and the head 205B may be pushed against the corresponding seat 206.

Figure 19:
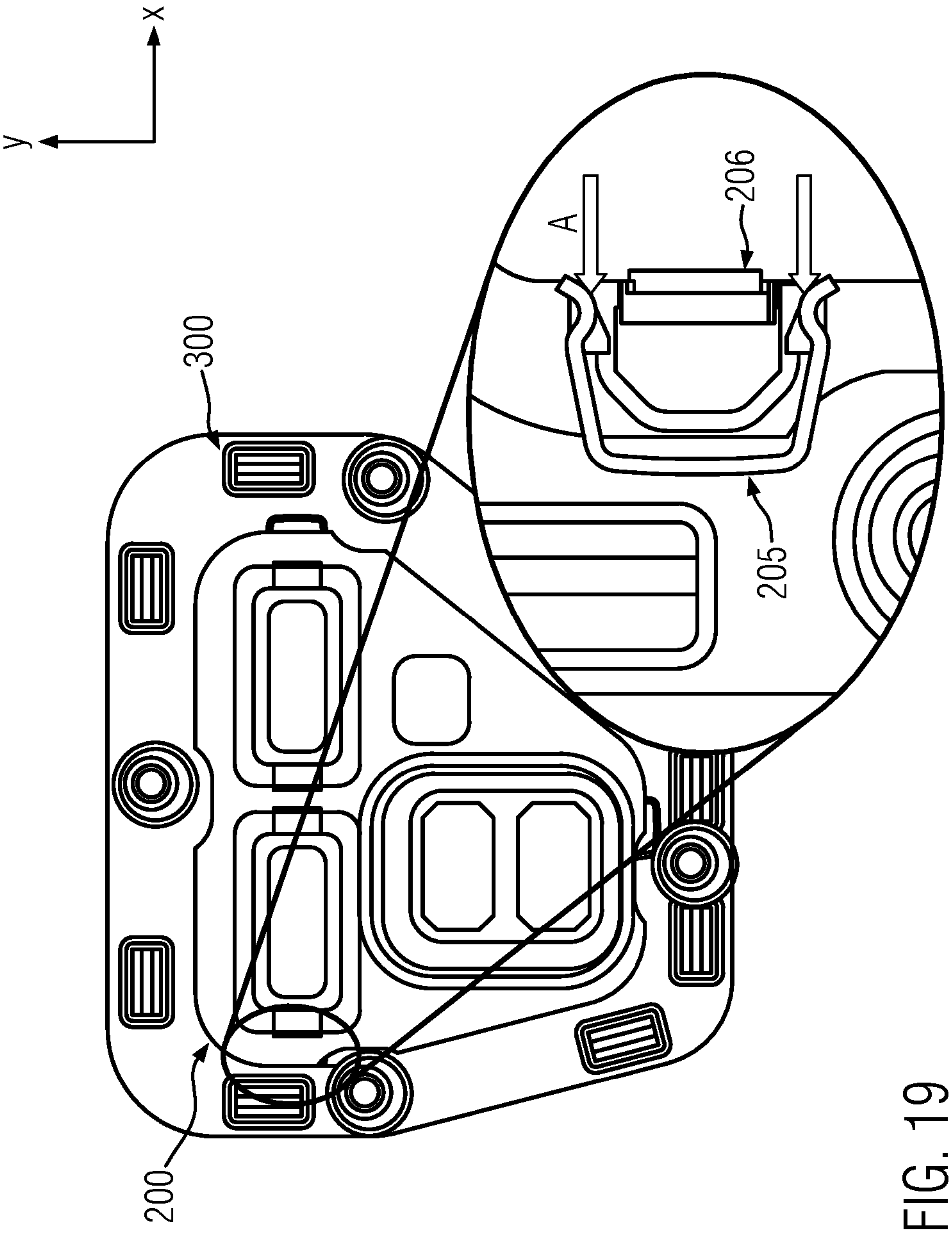
FIG. 19 schematically illustrates a top view of another configuration of the second main connector comprising centering elastic elements assembled with the front component of the compensation frame, for assembly with the main male connector, according to an embodiment of the present invention.

FIG. 19 schematically illustrates a configuration of the main female connector 200 with the centering spring clips 205, during disassembly from the main male connector 100 (which is not shown for better clarity). Once the main female connector 200 is removed from the main male connector 100, the centering spring clips 205 return to their rest positions and apply a counter-force against the inner walls of the front component of the compensation frame. As a consequence of this counter-force, the main female connector 200 is re-centered with respect to the compensation frame 300.

Further modifications and variations of the present invention will be clear for the person skilled in the art. Therefore, the present description has to be considered as including all the modifications and/or variations of the present invention, the scope of which is defined by the appended claims.

For instance, even if it has been shown that the main first connector 100 is a male connector and the main second connector 200 is a female connector, it is clear that the main first connector 100 may also be a female connector and the main second connector 200 may also be a male connector. For the purposes of the present invention, it is only necessary that the pair of main first and second connectors 100, 200 form a pair of male and female connectors.

For simplicity, identical or corresponding components are indicated in the figures with the same reference numbers.

While the invention has been described with respect to the preferred physical embodiments constructed in accordance therewith, it will be apparent to those skilled in the art that various modifications, variations and improvements of the present invention may be made in the light of the above teachings and within the scope of the appended claims without departing from the spirit of the invention.

What is claimed is:

1. A blind connection system, comprising:
- a main first connector having:
  - a first extremity with a first beveled surface; and
  - at least one pin; and
- a main second connector having:
  - a second extremity with a second beveled surface and insertable in the main first connector along an insertion direction; and
  - at least one hole, wherein:
- the main second connector is adapted to be displaced along at least one displacement direction perpendicular to the insertion direction, when at least one portion of the second beveled surface of the main second connector contacts at least one portion of the first beveled surface of the main first connector and the main second connector is inserted in the main first connector, in order to induce a coarse coaxial alignment with the main first connector along the displacement direction; and
- the at least one pin is inserted into the at least one hole along the insertion direction, the at least one hole displaced along the at least one displacement direction perpendicular to the insertion direction, in order to induce a fine coaxial alignment with the at least one pin along the displacement direction.

2. The blind connection system according to claim 1, wherein the first beveled surface of the main first connector and the second beveled surface of the main second connector have an equal slope so as to facilitate sliding of the main second connector into the main first connector.

3. The blind connection system according to claim 1, wherein:
- the main first connector further includes one or more auxiliary first connectors and the main second connector further includes one or more auxiliary second connectors mechanically connected to the one or more holes, the one or more auxiliary first connectors adapted to be mated with the corresponding one or more auxiliary second connectors; and
- when the at least one pin is inserted in the at least one corresponding hole along the insertion direction, the one or more auxiliary second connectors are displaced along the at least one displacement direction together with the at least one hole and a fine coaxial alignment between the one or more auxiliary first connectors and the one or more auxiliary second connectors along the displacement direction is obtained.

4. The blind connection system according to claim 1, wherein each of at least one pin has a third extremity with a third beveled surface and each of the at least one hole has a fourth extremity with a fourth beveled surface facilitating sliding of the at least one pin into the at least one hole.

5. The blind connection system according to claim 1, wherein the one or more auxiliary second connectors are movable along guiding means formed on an integral support element of the main second connector with respect to the support element.

6. The blind connection system according to claim 1, further comprising a compensation frame arranged between the main first connector and the main second connector, wherein the compensation frame includes a plurality of elastic means adapted to generate a compensation force and induce a displacement of at least one part of the main second connector along the insertion direction to compensate for any non-parallelism between the main first connector and the main second connector.

7. A blind connection system, comprising:
- a main first connector;
- a main second connector adapted for insertion into the main first connector along an insertion direction, the main second connector includes one or more centering elastic elements, the centering elastic elements are spring clips; and
- a compensation frame arranged between the main first connector and the main second connector, the compensation frame including a plurality of elastic elements adapted to generate a compensation force and induce a displacement of at least one part of the main second connector along the insertion direction.

8. The blind connection system according to claim 7, wherein the compensation frame includes a front component and a rear component between which the elastic elements are arranged.

9. The blind connection system according to claim 7, wherein the elastic elements are springs.

10. The blind connection system according to claim 9, wherein the elastic elements include four springs arranged at different corners of the compensation frame.

11. The blind connection system according to claim 7, wherein the compensation frame is coupled to the main second connector and includes one or more lateral recesses accommodating one or more lateral projecting portions formed on the main first connector mated to the main second connector, the one or more lateral projecting portions are induced to slide within the one or more lateral recesses when the main second connector and the coupled compensation frame are displaced along at least one of the displacement directions.

12. The blind connection system according to claim 11, wherein the displacement along at least one of the displacement directions is between 0 mm and 8 mm, and the one or more lateral projecting portions have a length corresponding to the displacement.

13. The blind connection system according to claim 8, wherein the compensation frame includes a plurality of retention elements adapted to maintain the front component and the rear component assembled when the elastic elements are pre-compressed.

14. The blind connection system according to claim 7, wherein the elastic means are adapted to sustain a displacement along said insertion direction comprised between 0 mm and 8 mm.

15. The blind connection system according to claim 7, wherein each centering elastic element is displaceable between a rest configuration and a compressed configuration and is adapted to facilitate insertion of the main second connector into the main first connector.

16. The blind connection system according to claim 15, wherein at least one of the one or more centering elastic elements is displaced from the rest configuration to the compressed configuration to center the main second connector with respect to the compensation frame.

17. The blind connection system according to claim 16, wherein the main second connector has one or more seats accommodating one or more centering elastic elements, the seats are symmetrically located along a perimeter of said main second connector.

18. A method for realizing a blind connection between a main first connector and a main second connector comprising the steps of:

providing a main first connector having:
- a first extremity with a first beveled surface; and
- at least one pin;

providing a main second connector having:
- a second extremity with a second beveled surface; and
- at least one hole;

positioning the main second connector such that at least one portion of the second beveled surface contacts at least one portion of the first beveled surface;

inserting the main second connector in the main first connector along an insertion direction, whereby a first force on the main second connector is created, the first force having a component along at least one displacement direction perpendicular to the insertion direction and displacing the main second connector and inducing a coarse coaxial alignment with the main first connector along the displacement direction; and inserting the at least one pin in the at least one hole along said insertion direction for generating a second force on the at least one hole, the second force having a component along at least one displacement direction perpendicular to the insertion direction and displacing the at least one hole inducing a fine coaxial alignment with the at least one pin along the displacement direction.

19. The method for realizing a blind connection according to claim 18, further comprising the steps of:

providing the main first connector with one or more auxiliary first connectors and providing the main second connector with one or more auxiliary second connectors mechanically connected to the at least one hole, the one or more auxiliary first connectors adapted to be mated with the corresponding one or more auxiliary second connectors; and generating a compensation force along the insertion direction via a plurality of elastic elements, a displacement of at least one part of the main second connector along the insertion direction is induced by the compensation force so as to compensate for any non-parallelism between the main first connector and the main second connector.

* * * * *